United States Patent [19]

Okita et al.

[11] Patent Number: 4,690,870

[45] Date of Patent: * Sep. 1, 1987

[54] MAGNETIC RECORDING MEDIUM

[75] Inventors: Tsutomu Okita; Nobuo Tsuji; Hiroshi Hashimoto; Yoshito Mukaida, all of Kanagawa, Japan

[73] Assignee: Fuji Photo Film Co., Ltd., Kanagawa, Japan

[*] Notice: The portion of the term of this patent subsequent to Mar. 18, 2003 has been disclaimed.

[21] Appl. No.: 654,290

[22] Filed: Sep. 25, 1984

[30] Foreign Application Priority Data

Sep. 26, 1983 [JP] Japan ............................ 58-177827

[51] Int. Cl.$^4$ ............................................ G11B 5/702
[52] U.S. Cl. ................................. 428/425.9; 427/44; 427/128; 252/62.54; 428/522; 428/532; 428/694; 428/900
[58] Field of Search .................... 427/44, 130, 131; 428/694, 695, 900, 425.9, 522, 532, 336; 360/134–136; 252/62.54

[56] References Cited

U.S. PATENT DOCUMENTS

| | | | |
|---|---|---|---|
| 4,004,997 | 1/1977 | Tsukamoto | 427/44 |
| 4,092,173 | 5/1978 | Novak | 427/44 |
| 4,343,831 | 8/1982 | Tsuji | 428/900 |
| 4,368,239 | 1/1983 | Nakajima | 428/520 |
| 4,407,853 | 10/1983 | Okita | 427/44 |
| 4,415,630 | 11/1983 | Kubota | 428/403 |
| 4,428,974 | 1/1984 | Okita | 427/44 |
| 4,434,210 | 2/1984 | Nakajima | 427/44 |
| 4,448,846 | 5/1984 | Chang | 427/44 |
| 4,448,848 | 3/1984 | Okita | 422/44 |
| 4,560,616 | 12/1985 | Okita | 428/900 |
| 4,576,866 | 3/1986 | Okita | 428/900 |

FOREIGN PATENT DOCUMENTS

0128711 10/1982 Japan .

*Primary Examiner*—Ellis P. Robinson
*Attorney, Agent, or Firm*—Sughrue, Mion, Zinn, Macpeak & Seas

[57] ABSTRACT

A magnetic recording medium comprising a non-magnetic support having thereon an electron-beam radiation-cured magnetic recording layer, said magnetic layer comprising a ferromagnetic oxide and a binder comprising (1) a resin selected from the group consisting of a vinyl resin containing a carboxylic group in an amount of about $5 \times 10^{-5}$ to $2 \times 10^{-3}$ equivalent per gram and a nitrocellulose resin;

(2) an urethane resin having at least one terminal acrylate group in the main chain or in a side chain of the molecule; and (3) a compound having at least one acryloyl group which is obtained by modifying the isocyanate group of a polyisocyanate having at least two isocyanate groups per molecule.

28 Claims, No Drawings

MAGNETIC RECORDING MEDIUM

FIELD OF THE INVENTION

The present invention relates to a magnetic recording medium, and more particulary it relates to a magnetic recording medium having improved electromagnetic properties and improved still life.

BACKGROUND OF THE INVENTION

At present, binders which are commonly used for magnetic recording media include thermoplastic resins such as vinyl chloride-vinyl acetate resins, vinyl chloridevinylidene chloride resins, or acrylonitrile butadiene resins as described in, for example, U.S. Pats. Nos. 3,634,137, 4,409,291 and 4,409,299, and thermosetting resins such as melamine resins, urea resins or polyurethane resins as described in, for example, U.S. Pats. Nos. 4,049,871, 4,154,895 and 4,333,988. These binders can be used alone or in combination. However, the magnetic layer containing such conventional binders does not have good wear resistance. In addition, these binders often stain the tape path of the magnetic recording tape.

It is known to use a binder which is crosslinked by a chemical reaction, such as an isocyanate compound or an epoxy compound which can be added to the above-described thermoplastic resins as described in, for example, U.S. Pats. Nos. 4,333,988 and 4,411,956. However, these cross-linkable binders have the disadvantages that (1) the solution in which magnetic particles are dispersed has poor storage stability, which adversely affects the homogeneity of the magnetic coating composition as well as that of the magnetic recording tape and (2) heat treatment at a temperature of 50° to 80° C. for 1 to 5 days is required to harden the magnetic recording layer after it is coated and dried, requiring a long period of time.

A magnetic recording tape which can be used for recording for an extended period of time has recently been developed and must withstand use under harsh conditions. For this purpose, the support should be thin and the mechanical properties of the magnetic layer should be improved. A method has been proposed to accomplish this purpose in which an oligomer or a monomer of acrylates is used as a binder and is hardened by electron beam radiation after it is dried, as disclosed in Japanese Patent Application (OPI) No. 25231/81 (the term "OPI" as used herein refers to a "published unexamined Japanese Patent Application") corresponding to U.S. Pat. No. 4,443,490. However, a magnetic recording medium having both excellent electromagnetic properties and excellent mechanical properties has not yet been developed.

SUMMARY OF THE INVENTION

A primary object of the present invention is to provide a magnetic recording medium having excellent electromagnetic properties.

Another object of the present invention is to provide a magnetic recording medium having excellent mechanical properties.

Still another object of the present invention is to provide a magnetic recording medium having excellent wear resistance.

A further object of the present invention is to provide a magnetic recording medium having good storage stability of the magnetic coating composition and having homogeneous physical properties.

A still further object of the present invention is to provide a process for producing a magnetic recording medium which does not require heat treatment in the production of the medium.

After thorough investigations, it has been found that these and other objects of the present invention can be achieved by irradiating electron beams on the magnetic recording layer comprising (1) a vinyl resin containing a carboxyl group in an amount of $5 \times 10^{-5}$ to $2 \times 10^{-3}$ equivalent per g of the polymer, or a nitrocellulose resin, (2) a urethane resin which is acrylate-modified at the terminals of the main chain or at the side chain of the molecule and (3) a compound containing an acryloyl group which is obtained by modifying the isocyanate group of a polyisocyanate having at least two isocyanate groups per molecule.

That is, the present invention provides a magnetic recording medium comprising a non-magnetic support having thereon an electron-beam cured magnetic recording layer comprising:

(1) a vinyl resin containing a carboxyl group in an amount of about $5 \times 10^{-5}$ to $2 \times 10^{-3}$ equivalent/g or a nitrocellulose resin, (2) A urethane resin having at least one terminal acrylate group in the main chain or in a side chain of the molecule, and (3) A compound having at least one acryloyl group which is obtained by modifying the isocyanate group of a polyisocyanate having at least two isocyanate groups per molecule.

The present invention also includes a process for the production of the above magnetic recording medium.

DETAILED DESCRIPTION OF THE INVENTION

In the magnetic recording medium according to the invention, useful examples of the vinyl resins (1) containing a carboxyl group include vinyl chloride-vinyl acetate-maleic acid copolymers, vinyl chloride-vinyl acetate-acrylic acid copolymers, vinyl chloride-vinyl propionate-maleic acid copolymers, vinyl chloride-vinyl propionate-butenic acid copolymers, and vinylidene chloride-vinyl acetate-maleic acid copolymers. Of these, vinyl chloride-vinyl acetate-maleic acid copolymers (e.g., 80–96:2–12:1–8 by weight) and vinyl chloride-vinyl propionate-maleic acid copolymers are preferred. The vinyl resin has a molecular weight of about 10,000 to 100,000, and preferably 20,000 to 50,000. The amount of carboxyl groups present in the copolymers is about $5 \times 10^{-5}$ to $2 \times 10^{-3}$ and preferably about $3 \times 10^{-4}$ to $1 \times 10^{-3}$ equivalent per gram of the copolymer. The electromagnetic properties of the magnetic recording medium tend to decrease if the amount of carboxyl groups present is outside the above ranges.

The nitrocellulose resin is not particularly limited, but that having a degree of polymerization of about 50 to 150 (average molecular weight: about 10,000 to 30,000) and a degree of nitration of about 10.7 to 11.5% is preferred. Cellulose dinitrate is most preferred.

Examples of the urethane resin (2) having terminal acrylate groups in the main chain or the side chain of the molecule include a polyether urethane resin, a polyester urethane resin or a polyester ether urethane resin which is acrylate-modified at the terminal groups of the main chain or at a hydroxyl group of the side chain.

Examples of suitable alcohol component of the urethane resin (2) include diethylene glycol, trimethylene glycol, butanediol, cyclohexanediol, etc. Examples of suitable acid component of the urethane resin (2) include adipic acid, sebacic acid, phthalic acid, isophthalic acid, etc. Examples of suitable isocyanate component of the urethane resin (2) include tolylene diisocyanate, diphenylmethane diisocyanate, isophorone diisocyanate, etc. Examples of suitable acrylate component of the urethane resin (2) include 2-hydroxyethyl acrylate, 2-hydroxyethyl methacrylate, 4-hydroxybutyl acrylate, etc.

The urethane resin (2) can be prepared by the method described in, for example, A. Vracken: *Fatipec Congress,* 11, 19 (1972).

The above-described urethane resin has a molecular weight in the range from about 20,000 to 300,000 and preferably about 30,000 to 200,000, as measured by liquid chromatography and comparatively determined based on the molecular weight of a standard polystyrene. If the molecular weight is outside the above ranges, the magnetic particles tend to disperse poorly.

Examples of compounds (3) having at least two acryloyl groups include polyacrylate compounds which are obtained by the reaction of (a) polyisocyanate such as tolylene diisocyanate, naphthalene 1,5-diisocyanate, o-tolylene diisocyanate, diphenylmethane diisocyanate, triphenylmethane triisocyanate, hexamethylene diisocyanate, isophorone diisocyanate, xylylene diisocyanate or an adduct of trimethylolpropane and tolylene diisocyanate (1:3 by mol)) with (b) acrylates containing a hydroxy group such as 2-hydroxyethyl acrylate or 4-hydroxybutyl acrylate. Examples of preferred polyisocyanate include tolylene diisocyanate, isophorone diisocyanate, and an adduct of 1 mol of trimethylolpropane and 3 mols of tolylene diisocyanate.

The compounds (3) have a molecular weight of about 500 to 1,500 and contain at least 1.5 acrylated isocyanate groups per mol of the polymer. They can be prepared in a manner similar to methods described in U.S. Pat. No. 4,092,173.

Compounds (1), (2) and (3) are used in combination.

In addition, a compound having 2 to 20 carbon atoms and having one or more carbon-carbon unsaturated bonds per molecule which can be polymerized by electron beam radiation can optionally be used in an amount of 15% by weight or less based on the total weight of the binder in combination with the three above-described binders. Preferred examples of such unsaturated compound include diethylene glycol diacrylate, trimethylolpropane triacrylate and 2-ethylhexyl acrylate, which are commercially available.

The ratio (parts by weight) of compound (1) to (2) is about 20:80 to 90:10 and preferably about 40:60 to 80:20. If the ratio of the compound (1) to compound (2) is below the above ranges, durability decreases. The proportion (parts by weight) of compound (3) is about 20 to 400 parts and preferably about 50 to 250 per 100 parts of the total amount of the compounds (1) to (2). If the amount of compound (3) added is higher than about 400 parts, the dose of electron radiation which is necessary for polymerization increases, which is not preferred. if the amount of compound (3) added is lower than about 20 parts, the cross-linking reaction is insufficient to obtain a satisfactory durability.

Ferromagnetic particles which can be used in the present invention include ferromagnetic iron oxide fine particles, Co-containing ferromagnetic iron oxide fine particles, ferromagnetic chromium dioxide fine particles, ferromagnetic alloy fine particles and barium ferrite as described in, for example U.S. Pats. Nos. 3,242,005 and 3,389,014. Ferromagnetic iron oxides and chromium dioxides used have an acicular ratio of about 2/1 to 20/1, and preferably about 5/1 or more. The average diameter thereof is about 0.2 to 2.0$\mu$. The ferromagnetic alloy particles have a metal content of about 75 wt % or more, and at least about 80 wt % of the metal content is a ferromagnetic metal (i.e., Fe, Co, Ni, Fe-Co, Fe-Ni, Co-Ni, Fe-Co-Ni). The ferromagnetic alloy particles preferably have a diameter of about 1.0$\mu$ or less. Organic solvents used for dispersing ferromagnetic particles and coating a magnetic composition include ketones such as acetone, methyl ethyl ketone, methyl isobutyl ketone or cyclohexanone; esters such as methyl acetate, ethyl acetate, butyl acetate, ethyl lactate or glycol acdtate monoethyl ether; ethers such as ether, tetrahydrofuran, glycol dimethyl ether, glycol monoethyl ether or dioxane; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene. Of these, methyl ethyl ketone, cyclohexanone, ethyl acetate, tetrahydrofuran, tolene and xylene are preferred.

Additives such as a lubricant, an abrasive, a dispersing agent, an antistatic agent or a rust-preventing agent can be added to the magnetic coating composition of the present invention, if desired. Lubricants include saturated or unsaturated higher fatty acid, fatty acid esters, higher fatty acid amides, higher alcohols, silicone oil, mineral oil, edible oil or fluoride compounds as described in, for example, U.S. Pats. Nos. 3,996,407, 4,007,313, 4,007,314 and 4,018,967. These additives can be added when the coating composition is prepared, or can be coated or sprayed on the surface of a magnetic recording layer with or without an organic solvent after drying, smoothing the magnetic layer or hardening the magnetic layer by electron irradiation.

Materials for the support include polyesters such as polyethylene terephthalate or polyethylene-2,6-naphthalate; polyolefins such as polyethylene or polypropylene; cellulose derivatives such as cellulose triacetate; plastics such as polycarbonate, polymide or polyamide imide; non-magnetic metals such as aluminum, copper, tin, zinc or non-magnetic alloys containing the above metals; plastics having a vapor-deposited metal layer such as aluminum; and paper or paper coated or laminated with polyolefins as described in, for example, U.S. Pat. No. 4,112,187 and EP-86302A and EP-88634A. Of these, polyethylene terephthalate and polyimide are preferred.

A backcoat as described in, for example, U.S. Pats. Nos. 3,166,688 and 3,761,311 can be provided on the support surface opposite to the magnetic layer for the purpose of preventing static charging, print through, wow or flutter, improving the strength of the magnetic recording medium and matting the back side of the support.

In electron irradiation of the magnetic layer after coating, a scanning method, a double scanning method, a curtain beam method or a broad curtain method as described in, for example, R. Kardashian et al: *Adhesive Age,* 1982 (12) 25 (1982) and R. Hutce: *Paint and Varnish Production,* 1969 (10) 99 (1969) can be employed for accelerating electron beams.

The electron beam irradiation can be carried out using an accelerating voltage of about 100 to 1,000 kV, preferably about 150 to 300 kV, and an absorption dose of about 1 to 20 megarads, preferably about 3 to 15 megarads. When the accelerating voltage is less than about 100 kV, the transmitted amount of energy is insufficient and when the accelerating voltage is more than about 1,000 kV, the energy efficiency used for polymerization is lowered. When the absorption dose is about 1 megarad or less, the curing reaction is insufficient to obtain a mechanically strong magnetic layer. When the absorption dose is more than about 20 megarads, the energy efficiency used for curing reaction is lowered or the irradiated object generates heat, tending to deform the plastic support.

The recording medium of the present invention can be prepared as described in, for example, U.S. Pats. Nos. 3,526,598 and 3,728,262 and 3,836,393.

The present invention is further illustrated in more detail by reference to the following Examples and Comparative Examples, although the present invention is not to be construed as being limited thereto. In the Examples and Comparative Examples, all parts are by weight, unless otherwise indicated.

EXAMPLE 1

| | |
|---|---|
| $\gamma$-$Fe_2O_3$ (Hc: 650 Oe, grain size: 0.5 × 0.05 $\mu$m) | 400 parts |
| Vinyl Chloride-Vinyl Acetate-Maleic Acid Copolymer (weight ratio: 93:4:3, molecular weight: 40,000 content of —$CO_2H$: 1.5 × $10^{-4}$ equivalent per g of polymer) | 35 parts |
| Urethane Acrylate (polyester urethane polyol which was a condensation product of adipic acid-butane diol-tolylene diisocyanate was modified by tolylene diisocyanate and reacted with 2-hydroxyethyl acrylate at the terminals of the molecule) (adipic acid:butane diol:tolylene diisocyanate:2-hydroxyethyl acrylate = 18:15:5:1, molecular weight: 50,000) $CH_2$=$CHCO_2CH_2CH_2OCONH(CH_2)_6NHCO_2CH_2CH_2OCOCH$=$CH_2$ | 35 parts 30 parts |
| Lecithin | 4 parts |
| Stearic Acid | 4 parts |
| Butyl Stearate | 4 parts |
| $Al_2O_3$ (average particle size: 0.3 $\mu$m) | 4 parts |
| Carbon Black (average particle size: 60 m$\mu$) | 10 parts |
| Methyl Ethyl Ketone | 1000 parts |

The above composition was mixed and kneaded in a ball mill for 50 hours to prepare a magnetic coating composition which was then coated by a doctor blade coating method in a dry thickness of 5$\mu$ on a polyethylene terephthalate support having a thickness of 15$\mu$. The magnetic recording layer thus obtained was subjected to magnetic orientation by cobalt magnets (2,000 Oe). An electron beam having an accelerating voltage of 200 kV and a beam current of 10 mA was applied such that the magnetic layer received an absorption dose of 10 Mrad. The resulting sample was identified as Sample No. 1.

Sample nos. 2 to 6 were prepared in the same manner as described in Example 1 except that the following binder compositions were substituted.

COMPARATIVE EXAMPLE 1 (Sample No. 2)

| | |
|---|---|
| Vinyl Chloride-Vinyl Acetate Resin (vinyl chloride: vinyl acetate: 86:14 (weight ratio), molecular weight: about 50,000) | 35 parts |
| Urethane Acrylate (same as that used in Example 1) | 35 parts |
| $CH_2$=$CHCO_2CH_2CH_2OCONH(CH_2)_6NHCO_2CH_2CH_2OCOCH$=$CH_2$ | 30 parts |

COMPARATIVE EXAMPLE 2 (Sample No. 3)

| | |
|---|---|
| Vinyl Chloride-Vinyl Acetate-Maleic Acid Copolymer ($CO_2H$ content: 1.5 × $10^{-4}$ equivalent per g of the polymer) (weight ratio: 93:4:3; molecular weight: about 35,000) | 35 parts |
| Urethane Resin (polyester urethane polyol of adipic acid, butane diol and tolylene diisocyanate) (adipic acid: tolylene diisocyanate = 4:5:1 by weight, molecular weight: about 40,000) | 35 parts |
| $CH_2$=$CHCO_2C_2H_4OCONH(CH_2)_2NHCO_2C_2H_4OCOCH$=$CH_2$ | 30 parts |

COMPARATIVE EXAMPLE 3 (Sample No. 4)

| | |
|---|---|
| Nitrocellulose ("RS ½ H" manufactured by Daicel Chemical Industries, Ltd.) molecular weight: about 20,000, degree of nitration: 11.1%) | 35 parts |
| Urethane Acrylate (same as that used in Example 1) | 35 parts |
| Trimethylolpropane Triacrylate | 30 parts |

EXAMPLE 2 (Sample No. 5)

| | |
|---|---|
| Nitrocellulose ("RS ½ H" manufactured by Daicel Chemical Industries, Ltd.) | 30 parts |
| Urethane Acrylate (polyester urethane polyol which was a condensation product of adipic acid, neopentyl glycol and diphenylmethane diisocyanate was modified by isophorone diisocyanate and modified by 2-hydroxyethyl acrylate at the terminals of the molecule) (adipic acid:neopentyl glycol:diphenylmethane diisocyanate:isophorone diisocyanate:2-hydroxyethyl acrylate = 6:6:1.5:1:1, average molecular weight: about 30,000, prepared by the method described in Japanese Patent | 30 parts |

| | |
|---|---|
| Application (OPI) No. 18892/79) Compound which was obtained by reacting an adduct of trimethylolpropane and tolylene diisocyanate (1:3 by weight) with 2-hydroxy ethyl acrylate | 40 parts |

EXAMPLE 3 (Sample No. 6)

| | |
|---|---|
| Vinyl Chloride-Vinyl Acetate-Maleic Acid Copolymer ($CO_2H$ content: $8 \times 10^{-4}$ equivalent per g of the polymer) (weight ratio: 93.4:4:2.6; molecular weight: about 40,000) | 30 parts |
| Urethane Acrylate (polyester urethane polyol comprised of cyclohexane-1,4-dicarboxylic acid, triethylene glycol and tolylene diisocyanate was reacted with isophorone diisocyanate and then acrylate-modified with 4-hydroxybutyl acrylate) (cyclohexane-1,4-dicarboxylic acid:triethylene glycol: tolylene diixocyanate: isophorone diisocyanate: 4-hydroxybutyl acrylate = 10:10:2:1:1, molecular weight: about 40,000, prepared by the method described in Japanese Patent Application (OPI) No. 18892/79) | 25 parts |
| Compound of Isophorone Diisocyanate which was acrylate-modified with 2-hydroxy ethyl acrylate (isophorone diisocyanate:2-hydroxyethyl acrylate = 1:2, prepared by the method described in Japanese Patent Application (OPI) NO. 18892/79) | 45 parts |

After 100 runs of the Samples described in Examples 1 to 3 and Comparative Examples 1 to 3 in video tape recorders, the coefficient of dynamic friction, still life and squareness ratio (residual magnetic flux density/maximum magnetic flux density) were measured and the results obtained are shown in Table 1.

The coefficient of dynamic friction and the still life were measured in the following manner:

Coefficient of Dynamic Friction

Tape tension ($T_1$) of a magnetic tape fed to the cylindrical drum of a VHS video tape recorder (Maclord 88 "NV-8200" manufactured by Matsushita Electric Industries Co., Ltd.), the tape tension ($T_2$) of the magnetic tape wound from the cylindrical drum were measured, and the coefficient of dynamic friction ($\mu$) was calculated by the following formula.

$$T_2/T_1 = e^{\mu\pi}$$

(Measurement was conducted at 40° C. and 65 %RH)

The value shown in Table 1 was measured after 100 runs.

Still Life

A video signal was recorded on each Sample and replayed in the still mode of a VHS video tape recorder ("NV 8200" manufactured by Matsushita Electric Industries Co., Ltd.) until an obvious breakdown of the reproduced signal was observed. The time taken to reach this point was measured. The measurement was conducted at 5° C. and 65 %RH.

Further, storage stability of the magnetic coating compositions was tested and results obtained are shown in Table 1.

Storage Stability

The magnetic coating compositions prepared in Examples 1 to 3 and Comparative Examples 1 to 3 each were placed in a test tube and allowed to stand at room temperatuare for 24 hours and change in the appearance was observed with naked eyes.

It is apparent from Table that a magnetic recording medium using the combination of binders in the present invention has excellent electromagnetic properties, a lower coefficient of dynamic friction and better still life than the comparative examples. And, the magnetic recording medium of the present invention can be prepared with greater consistency because the coating compositions used for magnetic layers have better storage stability.

TABLE 1

| Sample No. | Sauareness Ratio | Coefficient of Dynamic Friction after 100 Runs | Still Life (minutes) | Storage Stability |
|---|---|---|---|---|
| 1 | 0.83 | 0.21 | not less than 60 | No change |
| 2 (Comparison) | 0.65 | 0.40 | 15 | Separation of liquid was observed |
| 3 (Comparison) | 0.75 | 0.50 | 5 | Slight separation of liquid was observed |
| 4 (Comparison) | 0.78 | 0.41 | 10 | Slight separation of liquid was observed |
| 5 | 0.83 | 0.19 | not less than 60 | No change |
| 6 | 0.84 | 0.20 | not less than 60 | No change |

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a nonmagnetic support having thereon an electron beam radiation-cured magnetic recording layer, said magnetic layer comprising ferromagnetic particles and a binder comprising
    (1) a resin selected from the group consisting of a vinyl resin containing a carboxylic group in an amount of about $5 \times 10^{-5}$ to $2 \times 10^{-3}$ equivalent per gram and a nitrocellulose resin;
    (2) an urethane resin having at least one terminal acrylate group in the main chain or in a side chain of the molecule; and
    (3) a compound having at least one acryloyl group which is obtained by modifying the isocyanate group of a polyisocyanate having at least two isocyanate groups per molecule, wherein the ratio of said vinyl resin to said urethane resin is from about 20:80 to 90:10, and said compound containing at least one acryloyl group is present in an amount of from about 20 to 400 parts by weight per 100 parts of the total amount of said vinyl resin and said urethane resin.

2. The magnetic recording medium claimed in claim 1, wherein said vinyl resin is selected from the group consisting of a vinyl chloride-vinyl acetate-maleic acid copolymer, a vinyl chloride-vinyl acetate-acrylic acid copolymer, a vinyl chloride-vinyl propionate-maleic acid copolymer, a vinyl chloride-vinyl propionate-butenic acid copolymer and a vinylidene chloride-vinyl acetate-maleic acid copolymer.

3. The magnetic recording medium claimed in claim 2, wherein said vinyl resin contains a carboxylic group in an mount of from about $3 \times 10^{-4}$ to $1 \times 10^{-3}$ equivalent per gram.

4. The magnetic recordingmedium claimed in claim 1, wherein said urethane resin is a polyester urethane resin.

5. The magnetic recording medium claimed in claim 1, wherein said polyisocyanate is selected from the group consisting of tolylene diisocyanate, naphthalene 1,5-diisocyanate, o-tolylene doiisocyanate, diphenylmethane diisocyanate, triphenyl methane triisocyanate, hexamethylene diisocyanate, diophorone diisocyanate, xylylene diisocyanate, and an adduct of trimethylol propane and tolylene diisocyanate, and said compound having at least one acryloyl group is obtained by reacting said polyisocyanate with an acrylate containing a hydroxy group selected from the group consisting of 2-hydroxyethyl acrylate and 4-hydroxybutyl acrylate.

6. The magnetic recording medium as claimed in claim 1, wherein said resin (1) is said nitrocellulose resin which has a degree of polymerization of about 50 to about 150, an average molecular weight of about 10,000 to about 30,000 and a degree of nitration of about 10.7% to about 11.5%, further wherein said compound (3) is obtained by the reaction of (a) a polyisocyanate selected from the group consisting of tolylene diisocyanate, naphthalene 1,5-diisocyanate, o-tolylene diisocyanate, diphenylmethane diisocyanate, triphenylmethane triisocyanate, hexamethylene diisocyanate, isophorone diisocyanate, xylylene diisocyanate or an adduct of trimethylolpropane and tolylene diisocyanate (1:3 by mol) with (b) an acrylate containing a hydroxy group and wherein said compound (3) has a molecular weight of about 500 to about 1,500, which compound (3) contains at least 1.5 acrylated isocyanate groups per mole of the compound.

7. The magnetic recording medium claimed in claim 1, wherein the ratio of said vinyl resin to said urethane resin is from about 40:60 to 80:20, and said compound having at least one acryloyl group is present in an amount of from about 50 to 250 parts by weight per 100 parts of the total amount of said vinyl resin and said urethane resin.

8. The magnetic recording medium claimed in claim 1, wherein the ratio of said ferromagnetic particles to said total binder is from about 300:100 to about 600:100.

9. The magnetic recording medium claimed in claim 1, wherein said nitrocellulose resin has a degree of nitration of from about 10.7% to about 11.5%.

10. A method for producing a magnetic recording medium comprising the steps of
(A) coating a magnetic recording layer on a non-magnetic support, said layer comprising ferromagnetic particles and a binder comprising
(1) a resin selected from the group consisting of a vinyl resin containing a carboxylic group in an amount of about $5 \times 10^{-5}$ to $2 \times 10^{-3}$ equivalent per gram and nitrocellulose resin;
(2) a urethane resin having at least one terminal acrylate group in the main chain or in a side chain of the molecule; and
(3) a compound having at least one acryloyl group which is obtained by modifying the isocyanate group of polyisocyanate having at least one isocyanate group per molecule; and
(B) curing said magnetic layer by electron beam irradiation using an accelerating voltage of from about 100 to 1000 kV and an absorption dose of from about 1 to 20 megarads, wherein the ratio of said vinyl resin to said urethane resin is from about 20:80 to 90:10, and said compound containing at least one acryloyl group is present in an amount of from about 20 to 400 parts by weight per 100 parts of the total amount of said vinyl resin and said urethane resin.

11. The method claimed in claim 10, wherein said electron beam irradiation is carried out using an accelerating voltage of about 150 to 300 kV and an absorption dose of from about 3 to 15 megarads.

12. The magnetic recording medium as claimed in claim 1, wherein resin (1) is said vinyl resin.

13. The magnetic recording medium as claimed in claim 1, wherein resin (1) is said nitrocellulose resin.

14. The magnetic recording medium as claimed in claim 1, wherein said compound (3) contains at least 1.5 acrylated isocyanate groups per mol of the polymer.

15. The magnetic recording medium claimed in claim 12, wherein said vinyl resin is a vinyl chloride-vinyl acetate-maleic acid copolymer.

16. The magnetic recording medium as claimed in claim 1, wherein said vinyl resin has a molecular weight of about 10,000 to about 100,000.

17. The magnetic recording medium as claimed in claim 1, wherein said vinyl resin has a molecular weight of 20,000 to 50,000.

18. The method of claim 10 wherein said vinyl resin has a molecular weight of from about 10,000 to about 100,000.

19. The method of claim 10 wherein said vinyl resin has a molecular weight of from 20,000 to 50,000.

20. The magnetic recording medium claimed in claim 1, wherein said compound (3) contains at least 1.5 acrylated isocyanate groups per mole of the compound, said resin (1) is said vinyl resin having a molecular weight of about 10,000 to about 100,000, said compound (3) is obtained by the reaction of (a) a polyisocyanate selected fromn the group consisting of tolylene diisocyanate, naphthalene 1,5-diisocyanate, o-tolylene diisocyanate, diphenylmethane diisocyanate, triphenylmethane triisocyanate, hexamethylene diisocyanate, isophorone diisocyanate, xylylene diisocyanate or an adduct of trimethylolpropane and tolylene diisocyanate (1:3 by mol) with (b) an acrylate containing a hydroxy group and wherein said compound (3) has a molecular weight of about 500 to about 1,500.

21. The method claimed in claim 10, wherein said compound (3) contains at least 1.5 acrylated isocyanate groups per mole of the compound, said resin (1) is said vinyl resin having a molecular weight of about 10,000 to about 100,000, said compound (3) is obtained by the reaction of (a) a polyisocyanate selected from the group consisting of tolylene diisocyanate, naphthalene 1,5-diisocyanate, o-tolylene diisocyanate, diphenylmethane diisocyanate, triphenylmethane triisocyanate, hexamethylene diisocyanate, isophorone diisocyanate, xylylene diisocyanate or an adduct of trimethylolpropane and tolylene diisocyanate (1:3 by mol) wth (b) an acrylate containing a hydroxy group and wherein said compound (3) has a molecular weight of about 500 to about 1,500.

22. The magnetic recording medium as claimed in claim 20, wherein said compound (3) is obtained by the reaction of (a) a polyisocyanate selected from the group consisting of tolylene diisocyanate, isophorone diisocyanate and an adduct of 1 mole of trimethylol propane and 3 moles of tolylene diisocyanate with (b) an acrylate containing a hydroxy group.

23. The method claimed in claim 21, wherein compound (3) is obtained by the reaction of (a) a polyisocyanate selected from the group consisting of tolylene diisocyanate, isophorone diisocyanate and an adduct of 1 mole of trimethylol propane and 3 moles of tolylene diisocyanate with (b) an acrylate containing a hydroxy group.

24. The magnetic recording medium as claimed in claim 22, wherein said vinyl resin is a vinyl chloride vinyl acetate-maleic acid copolymer.

25. The method as claimed in claim 23, wherein said vinyl resin is a vinyl chloride-vinyl acetate-maleic acid copolymer.

26. The method as claimed in claim 10, wherein said resin (1) is said nitrocellulose resin which has a degree of polymerization of about 50 to about 150, an average molecular weight of about 10,000 to about 30,000 and a degree of nitration of about 10.7% to about 11.5%, further wheren said compound (3) is obtained by the reaction of (a) a polyisocyanate selected from the group consisting of tolylene diisocyanate, naphthalene 1,5-diisocyanate, o-tolylene diisocyanate, diphenylmethane diisocyanate, triphenylmethane triisocyanate, hexamethylene diisocyanate, isophorone diisocyanate, xylylene diisocyanate or an adduct of trimethylolpropane and tolylene diisocyanate (1:3 by mol) with (b) an acrylate containing a hydroxy group and wherein said compound (3) has a molecular weight of about 500 to about 1,500 which compound (3) contains at least 1.5 acrylated isocyanate groups per mole of the compound.

27. The magnetic recording medium as claimed in claim 6, wherein said compound (3) is obtained by the reaction of (a) a polyisocyanate selected from the group consisting of tolylene diisocyanate, isophorone diisocyanate and an adduct of 1 mole of trimethylol propane and 3 moles of tolylene diisocyanate with (b) an acrylate containing a hydroxy group.

28. The method claimed in claim 26, wherein said compound (3) is obtained by the reaction of (a) a polyisocyanate selected from the group consisting of tolylene diisocyanate, isophorone diisocyanate and an adduct of 1 mole of trimethylol propane and 3 moles of tolylene diisocyanate with (b) an acrylate containing a hydroxy group.

* * * * *